United States Patent
Randahl et al.

(10) Patent No.: US 6,636,605 B1
(45) Date of Patent: Oct. 21, 2003

(54) ECHO AND DISTORTION CANCELLATION ARRANGEMENT

(75) Inventors: Torbjörn Randahl, Nacka (SE); Stefan Barkarö, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/468,365

(22) Filed: Dec. 21, 1999

(30) Foreign Application Priority Data

Dec. 22, 1998 (SE) .............................................. 9804505
Mar. 9, 1999 (SE) .............................................. 9900838

(51) Int. Cl.[7] .............................................. H04M 1/00
(52) U.S. Cl. .............................................. 379/406.01
(58) Field of Search .................. 379/399.01, 400, 379/402, 413.02, 413.04, 414, 412, 403, 398, 406.01, 406.02, 406.03, 406.04, 406.06; 370/286; 381/94.1

(56) References Cited

U.S. PATENT DOCUMENTS

| | | |
|---|---|---|
| 5,166,635 A | 11/1992 | Shih |
| 5,235,617 A | 8/1993 | Mallard, Jr. |
| 5,675,613 A | 10/1997 | Uwano et al. |
| 5,856,758 A | 1/1999 | Joffe et al. |
| 5,999,619 A * | 12/1999 | Bingel .......................... 379/394 |
| 6,226,322 B1 * | 5/2001 | Mukherjee ................... 375/229 |
| 6,298,046 B1 * | 10/2001 | Thiele ......................... 370/282 |

* cited by examiner

Primary Examiner—Rexford Barnie

(57) ABSTRACT

At the output of a line driver (1) connected to a long transmission line, signals received on the transmission line are only a fraction of signals transmitted by the line driver on the transmission line. To minimize the transmitted signal with its distortion and noise in the receive path of the line driver, an additional driver (4) having the same voltages and currents in the signal path, is added. The additional driver (4) drives an additional load (Z2). The signal transmitted to the transmission line together with its superimposed received signal, is subtracted from the signal from the additional driver (4), which is not superimposed on any received signal. The resulting signal is reduced from transmitted signal, transmitted distortion and transmitted noise. To minimize die size and power consumption, the additional driver (4) is scaled, but the distortion remains unchanged compared to the "normal" line driver.

6 Claims, 3 Drawing Sheets

ECHO AND DISTORTION CANCELLATION ARRANGEMENT

TECHNICAL FIELD

The invention relates generally to line drivers and more specifically to an echo and distortion cancellation arrangement in line drivers.

BACKGROUND OF THE INVENTION

In a line driver connected to a telephone line for transmitting signals generated by a signal source and receiving signals incoming on the transmission line, echoes and distortions caused by the line driver itself as well as by the signal source appear together with the signals to be transmitted and the signals to be received across the output terminals of the line driver.

With long transmission lines, the received signals are only fractions of the transmitted signals at the line driver output.

SUMMARY OF THE INVENTION

The object of the invention is to reduce such echoes and distortions in the receive path of the line driver.

This is attained in accordance with the invention by providing an additional driver for driving a separate load with the same voltages and currents in its signal path as the "normal" line driver.

The additional driver is, thus, not affected by signals received on the telephone line since it, instead, is connected to that separate load.

Thus, the additional driver mirrors the signal to be transmitted by the "normal" line driver with the same distortion and signal levels to the separate load.

By subtracting the signal on the telephone line, which includes both the large transmitted signal with its related distortion and the often small received signal, from the signal "transmitted" to the separate load by the additional driver, which only includes the large transmitted signal and its related distortion, the difference will ideally be the signal received on the telephone line, reduced from the transmitted signal as well as the transmitted distortion and noise.

Since the transmitted signal has the same currents and voltages in the signal path through both the "normal" line driver and the additional driver, and both the line driver and the additional driver are preferably fabricated on the same die, the difference in distortion and voltage levels of the transmitted signals will be minimized.

BRIEF DESCRIPTION OF THE DRAWING

The invention will be described more in detail below with reference to the appended drawing on which

DESCRIPTION OF THE INVENTION

Figure 1:
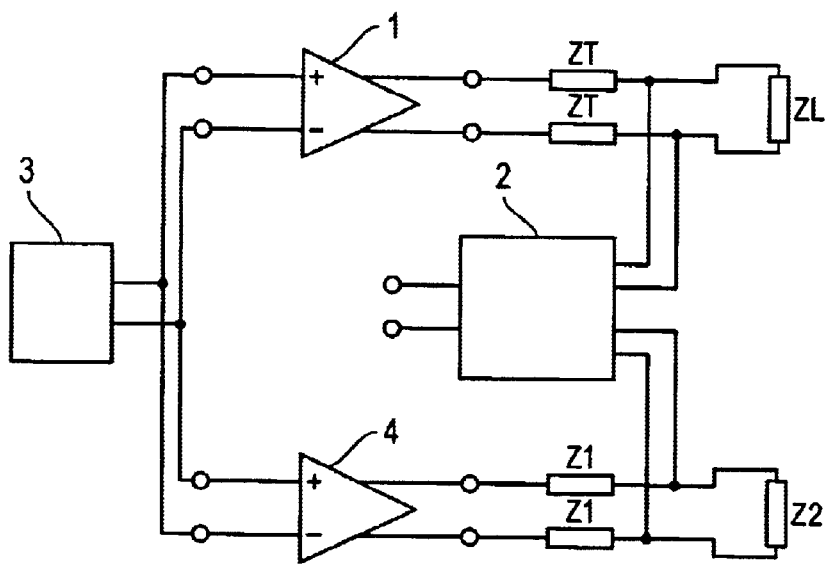
FIG. 1 illustrates a known line driver with a first embodiment of an arrangement according to the invention.

FIG. 1 shows a known line driver 1 with a first embodiment of an echo and distortion cancellation arrangement in accordance with the invention.

In a manner known per se, the known line driver 1 has two input terminals and two output terminals.

In the embodiment in FIG. 1, the output terminals of the line driver 1 are connected via terminating impedances ZT to respective wire of a two-wire transmission line as well as to input terminals of receiving means 2 for receiving signals incoming on the transmission line. A line impedance of the transmission line is denoted ZL in FIG. 1.

The input terminals of the line driver 1 are connected to output terminals of a signal source 3 for generating output signals to be transmitted on the transmission line.

The output signals of the line driver 1 on the transmission line, emanating from the signal source 3, are superimposed on signals coming in to the line driver 1 on the transmission line to be received by the receiving means 2 for further processing. The receiving means 2 is connected with its output terminals to signal processing means, e.g. an analog-to-digital converter (not shown).

The output signals of the line driver 1 on the transmission line, i.e. the transmitted signals, are accompanied by distortion and noise generated by the line driver 1 itself as well as by the signal source 3.

At the output terminals of the line driver 1, the output signals are large.

At the same time, signals coming in to the line driver 1 on the transmission line, i.e. the received signals, are small in comparison with the transmitted signals.

Figure 2A:
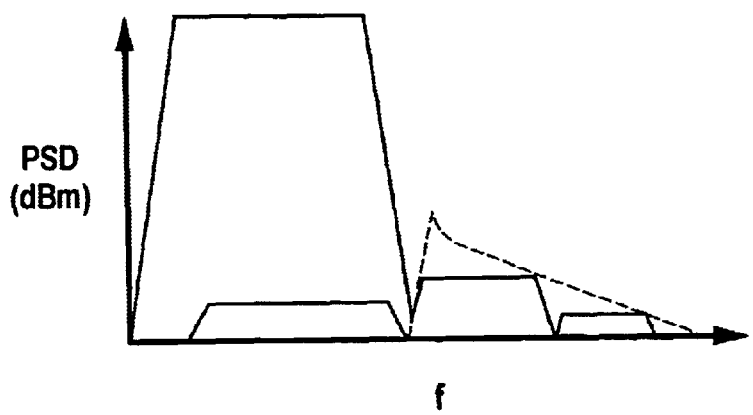
FIGS. 2a, 2b and 2c are signal diagrams illustrating different signals in the embodiment in FIG. 1.

FIG. 2a schematically illustrates the power spectral density (PSD) in dBm versus frequency f of the signals at the output of the line driver 1 in FIG. 1 towards the transmission line.

The transmitted signal is represented by solid lines, the distortion associated with the transmitted signal is represented by dotted lines, and the received signal is represented by dashed lines.

As apparent from FIG. 2a, the distortion may be of the same level as the received signal.

In accordance with the invention, to cancel echo and distortion that appear across the output terminals of the line driver 1, an echo and distortion cancellation arrangement in the form of a modified version of the known line driver described above, is added to the known line driver 1 to cooperate therewith.

The echo and distortion cancellation arrangement according to the invention, i.e. the additional driver 4 also has two input terminals and two output terminals.

The output terminals of the additional driver 4 are connected via impedances Z1 across a load Z2 as well as to additional input terminals of the receiving means 2.

The input terminals of the additional driver 4 are connected to the output terminals of the signal source 3 for generating the same signals across the load Z2 as generated by the line driver 1 across the telephone line.

Figure 2B:
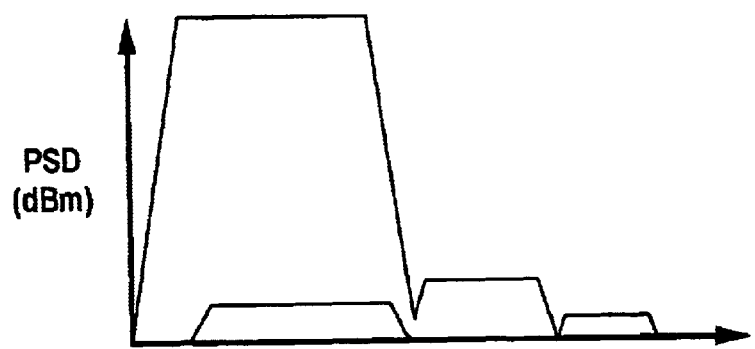

FIG. 2b schematically illustrates the signals at the output of the additional driver 4 towards the load Z2.

The signal transmitted to the load Z2 is represented by solid lines, and the distortion associated with that signal is represented by dotted lines.

As apparent, the signals transmitted on the telephone line and to the load Z2 as illustrated in FIGS. 2a and 2b, respectively, as well as the distortion associated with these signals, are the same.

In accordance with the invention, the receiving means 2 is adapted to subtract the signal generated across the load Z2 as illustrated in FIG. 2b from the signals on the transmission line as illustrated in FIG. 2a in order to cancel the transmitted signal with its distortion and noise from the incoming signal on the transmission line.

Figure 2C:
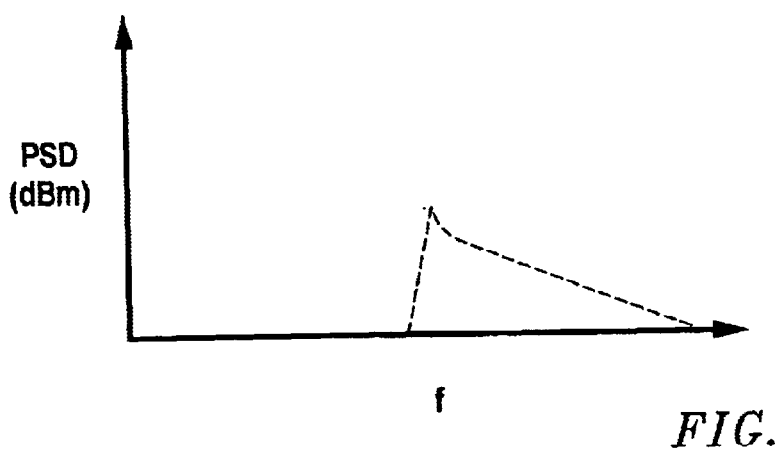

This is schematically illustrated in FIG. 2c in which only the received signal remains after the subtraction by the receiving means 2. In practice, it is however to be understood that a portion of the transmitted signal as well as a portion of its associated distortion also can remain after the subtraction.

In accordance with the invention, to reduce the power consumption of the additional driver 4, the impedances Z1 are of an impedance value that is k times the impedance value of the terminating impedances ZT, k being an integer. Also, the impedance value of the load Z2 is k times the impedance between the output terminals of the line driver 1.

Also, in accordance with the invention, the size of the output transistors (not shown) of the additional driver 4 is 1/k times the size of the output transistors (not shown) of the line driver 1.

The reason for scaling the output transistors in the additional driver 4 is to achieve the same current density in both the "normal" line driver 1 and the additional driver 4 in order to get the same distortion.

Hereby, echoes and distortions will be efficiently canceled from the input signals on the transmission line to be received by signal processing means (not shown) connected to the output terminals of the receiving means 2.

Figure 3:
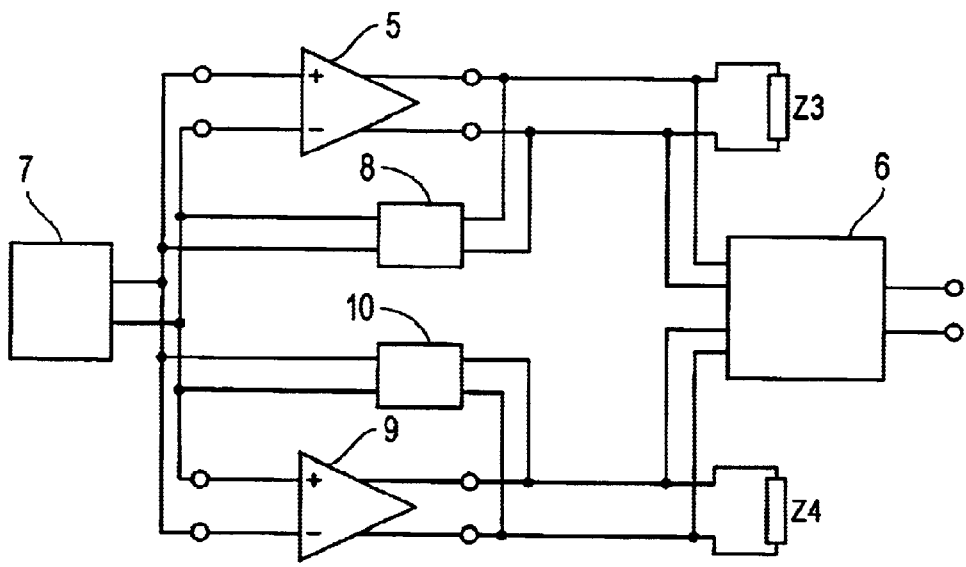
FIG. 3 illustrates another known line driver with a second embodiment of an arrangement according to the invention.

FIG. 3 shows another embodiment of a known line driver 5 with a second embodiment of an echo and distortion cancellation arrangement in accordance with the invention.

In a manner known per se, the known line driver 5 in FIG. 3 has two input terminals and two output terminals.

In the same manner as described above in connection with FIG. 1, the output terminals of the line driver 5 are connected to respective wire of a two-wire transmission line as well as two input terminals of a receiving means 6 for receiving signals incoming on the transmission line. In FIG. 3, the transmission line has a line impedance Z3.

The input terminals of the line driver 5 are connected to output terminals of a signal source 7 for generating output signals to be transmitted on the transmission line.

The input terminals of the line driver 5 are also connected in a manner known per se to output terminals of a current-to-voltage converter 8 which is connected with its input terminals to the wires of the transmission line.

The line driver output signals on the transmission line, emanating from the signal source 7, are superimposed on signals coming in to the line driver 5 on the transmission line to be received by the receiving means 6 for further processing. The receiving means 6 is connected with its output terminals to signal processing means, e.g. an analog-to-digital converter (not shown).

The line driver output signals on the transmission line, i.e. the transmitted signals, are accompanied by distortion and noise generated i.a. by the signal source 7.

As described above in connection with FIG. 1, the output signals at the output terminals of the line driver 5 are large, while incoming signals to the line driver 5 on the transmission line, i,e. the received signals, are small in comparison with the transmitted signals.

Also in the line driver 5 in FIG. 3, the power spectral density, PSD, versus frequency, f, of the signals at the output of the line driver 5 will be as illustrated in FIG. 2a.

Also in the embodiment in accordance with FIG. 3, to cancel echo and distortion that appear across the output terminals of the line driver 5, an echo and distortion cancellation arrangement in the form of a modified version of the known line driver 5 described above, is added to the known line driver 5 to cooperate therewith.

The echo and distortion cancellation arrangement according to the embodiment in FIG. 3, i.e. the additional driver 9, has two input terminals and two output terminals, The output terminals of the additional driver 9 are connected to a load Z4 as well as to additional input terminals of the receiving means 6.

The input terminals of the additional driver 9 are connected to the output terminals of the signal source 7 for generating the same signals across the load Z4 as generated by the line driver 5 across the telephone line.

Also in this case, FIG. 2b schematically illustrates the signal on the output of the additional driver 9 towards the load Z4.

The input terminals of the additional driver 9 are also connected to output terminals of a current-to-voltage converter 10 which is connected with its input terminals to the output terminals of the additional driver 9.

As in the embodiment in FIG. 1, the receiving means 6 in FIG. 3 is adapted to subtract the signal generated across the load Z4 from the signals on the transmission line in order to cancel the transmitted signal with its distortion and noise from the incoming signals on the transmission line.

In accordance with the invention, to reduce the power consumption of the additional driver 9, the impedance value of the load Z4 is k times the impedance between the output terminals of the line driver 5, k being an integer.

Moreover, in accordance with the invention, the current-to-voltage converter 10 has a current-to-voltage conversion factor that is k times the current-to-voltage conversion factor of the current-to-voltage converter 8.

Also in this case, the size of the output transistors (not shown) of the additional driver 9 are 1/k times the size of the output transistors (not shown) of the line driver 5 to achieve the same current density in both the "normal" line driver 5 and the additional driver 9 in order to get the same distortion.

Figure 4:
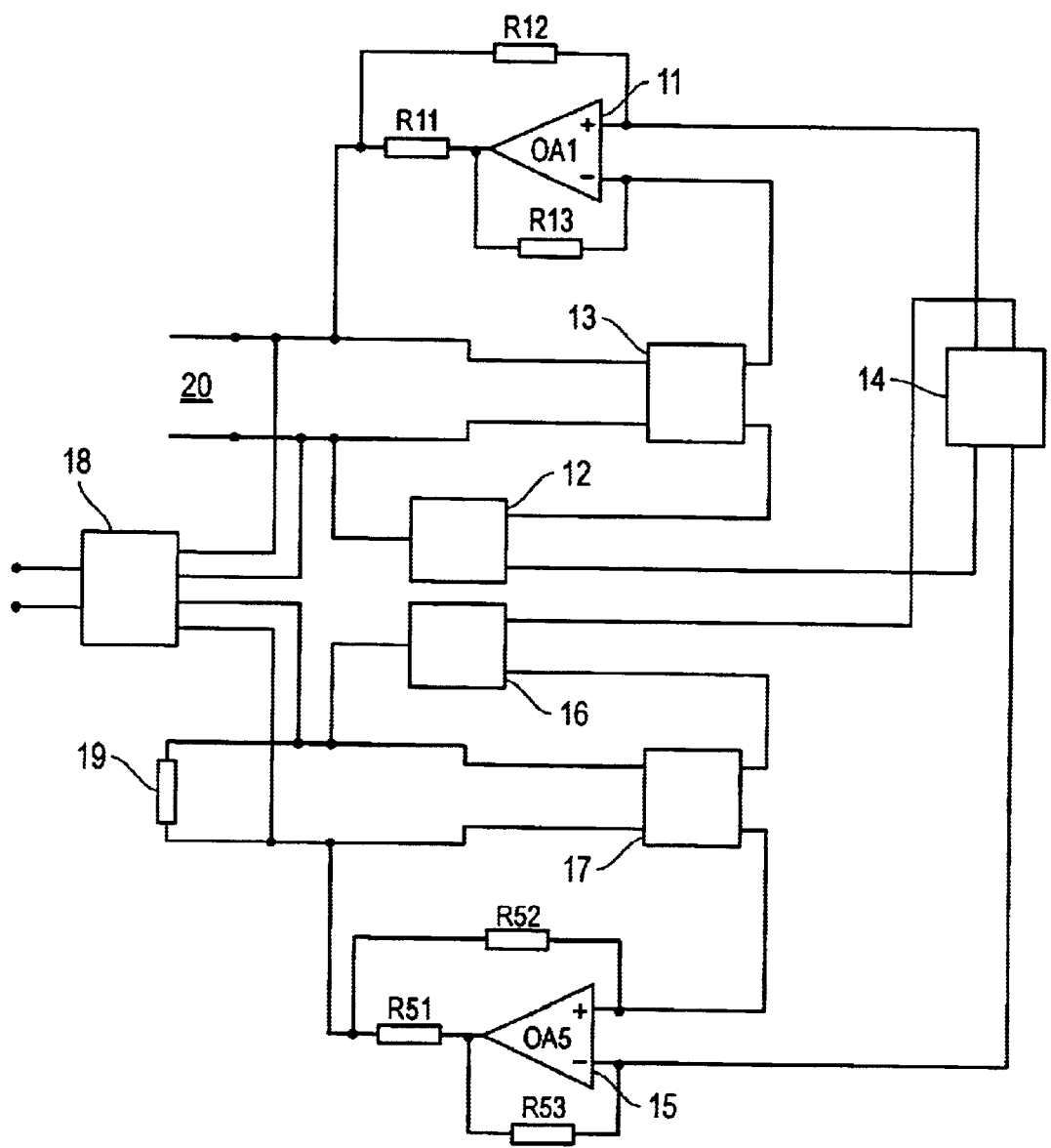
FIG. 4 illustrates a further known line driver with a third embodiment of an arrangement according to the invention.

FIG. 4 shows an embodiment of a further known line driver with an echo and distortion cancellation arrangement in accordance with the invention.

The known line driver comprises two current amplifiers 11, 12 connected with their outputs to the respective wire of a two-wire transmission line 20. The inputs of the current amplifiers 11, 12 are connected, on the one band, to outputs from a signal source 14 for generating output signals on the transmission line 20, and, on the other hand, to outputs from a voltage-to-current converter 13, the inputs of which are connected to the transmission line 20. The voltage-to-current converter 13 is part of a loop that sets the termination impedance of the line driver. The voltage-to-current converter 13 feeds back a current which is a function of the output voltage. This current is then amplified and fed back by the line driver to the transmission line 20. The result will then be an active impedance.

The current amplifiers 11, 12 are identical. In view hereof, in FIG. 4, only an embodiment of the current amplifier 11 is shown in more detail.

The current amplifier 11 comprises an operational amplifier OA1 and three resistors R11, R12 and R13.

The resistor R11 is connected between the output terminal of the operational amplifier OA1 and the output terminal of the current amplifier 11, connected to one of the wires of the transmission line 20.

The resistor R12 is connected between the output terminal of the current amplifier 11 and the (+)-input terminal of the operational amplifier OA1.

The resistor R13 is connected between the output terminal of the operational amplifier OA1 and the (−)-input terminal of the operational amplifier OA1.

The line driver output signals on the transmission line 20, emanating from the signal source 14, are superimposed on line driver input signals on the transmission line 20 to be received by receiving means 18 to be processed in the line driver. The receiving means 18 are connected to signal processing means, e.g. an analog-to-digital is converter (not shown).

The line driver output signals on the transmission line 20, i.e. the transmitted signals, are accompanied by distortion and noise generated within the line driver, i.a, by the signal source 14.

At the same time, input signals on the transmission line 20 to the line driver, i.e. the received signals, are small in comparison with the transmitted signals.

Also in this case, FIG. 2a schematically illustrates the power spectral density (PSD) in dBm versus frequency f of the signals on the output of the line driver towards the transmission line 20.

The transmitted signal is represented by solid lines, the distortion associated with the transmitted signal is represented by dotted lines, and the received signal is represented by dashed lines.

As indicated above, the distortion may be of the same signal level as the received signal as is also apparent from FIG. 2a.

In accordance with the invention, to cancel the distortion that appears across the output terminals of the line driver connected to the telephone line 20, an echo and distortion cancellation arrangement in the form of a modified version of the known line driver described above, is added to the known line driver to cooperate therewith.

The echo and distortion cancellation arrangement according to the invention, i e. the additional driver, comprises two current amplifiers 15, 16 connected with their outputs to a load 19 and with their inputs, on the one hand, to outputs from the signal source 14 for generating the same signals across the load 19 as those generated on the telephone line 20, and, on the other hand, to outputs from a voltage-to-current converter 17, the inputs of which are connected to the load 19. The voltage-to-current converter 17 is also part of a loop that sets the termination impedance of the added driver, i.e. the impedance between the output terminals of the current amplifiers 15, 16. The voltage-to-current converter 17 feeds back a current which is a function of the output voltage, and this current which is then amplified and fed back by the added driver to the load 19. The result will then be an active impedance.

The current amplifiers 15, 16 are also identical. In view hereof, only the current amplifier 15 is shown in more detail.

The current amplifier 15 comprises an operational amplifier OA5 and three resistors R51, R52 and R53.

The resistor R51 is connected between the output terminal of the operational amplifier OA5 and the output terminal of the current amplifier 15, i.e. one end of the load 19.

The resistor R52 is connected between the output terminal of the current amplifier 15, i.e. one end of the load 19, and the (+)-input terminal of the operational amplifier OA5. The resistor R53 is connected between the output terminal of the operational amplifier OA5 and the (−)-input terminal of the operational amplifier OA5.

The load 19 is also connected between inputs of the receiving means 18.

In this case, FIG. 2b schematically illustrates the signals on the output of the added driver towards the load 19.

The signal transmitted to the load 19 is represented by the solid lines, and the distortion associated with that signal is represented by the dotted lines As apparent, the transmitted signals as illustrated in FIGS. 2a and 2b as well as the distortion associated with these signals, are the same.

In accordance with the invention, the receiving means 18 are adapted to subtract the signals generated across the load 19 from the signals on the transmission line 20 in order to cancel the transmitted signal with its distortion and noise from the input signals on the transmission line 20.

This is schematically illustrated by FIG. 2c in which only the received signal remains after the subtraction by the receiving means 18.

In practice, it is however to be understood that a portion of the transmitted signal as well as its associated distortion also may remain after the subtraction.

To enable-this cancellation, in accordance with the invention, the current amplifiers 15, 16 have a current amplification factor that is 1/k times the current amplification factor of the current amplifiers 11, 12, and the impedance of the load 19 is k times the impedance seen on the transmission line 20 from the outputs of the current amplifiers 11, 12.

The current amplification factor is set in an identical manner in all current amplifiers 11, 12, 15 and 16.

Thus, in e.g. the current amplifier 11, the current amplification factor on the (+)-input of the operational amplifier OA1 is set by (R12+R11)/R11, and on the (−)-input by−R13/R11. In practice, the current amplification factor is equal on both inputs but its phase is shifted 180° on the (−)-input. If R12=R13−R11, the current amplification factor is the same on both inputs (however phase shifted).

As indicated above, in accordance with the invention, the input active impedance between the output terminals of the current amplifiers 15, 16, is k times the impedance between the output terminals of the current amplifiers 11, 12, i.e. the impedance of the transmission line 20 as seen from the output terminals of the line driver.

Furthermore, in accordance with the invention, the resistance of the resistor R51 in the current amplifier 15 and, consequently, also of the same resistor (not shown) in the current amplifier 16, is chosen to be k times the resistance of the resistor R11 in the current amplifier 11 and, consequently, of the same resistor (not shown) in the current amplifier 12.

Also, in accordance with the invention, in the current amplifiers 15, 16, the size of the output transistors (not shown) is chosen to be 1/k times the size of the output transistors (not shown) in the current amplifiers 11, 12.

The reason for the scaling of the output transistors in the added driver is to achieve the same current density in both the "normal" line driver and the added driver in order to get the same distortion.

Hereby, echoes and distortions will be efficiently canceled from the input signals on the transmission line to be received by signal processing means connected to the receiving means 18.

What is claimed is:

1. An echo and distortion cancellation arrangement for a line driver comprising:

two input terminals;

two output terminals, wherein the output terminals of the line driver are connected to respective wire of a two-wire transmission line as well as to input terminals of receiving means for receiving incoming signals on the transmission line, and wherein the input terminals of the line driver are connected to output terminals of a signal source for generating output signals on the transmission line, an additional driver having two input terminals and two output terminals, wherein the output terminals of the additional driver are connected to a load as well as to additional input terminals of said receiving means, the input terminals of the additional driver are connected to the output terminals of the signal source for generating signals across the load, and the receiving means subtract the signals generated across the load from the signals appearing on the transmission line to cancel echo, distortion and noise from the incoming signals on the transmission line.

2. The arrangement as claimed in claim 1, wherein the output terminals of the line driver are connected to the respective wire of the two-wire transmission line via terminating impedances wherein the output terminals of the additional driver are connected to the load via impedances, wherein the load has an impedance value that is k times the impedance value between the output terminals of the line driver, k being an integer, and wherein said impedances have an impedance value that is k times the impedance value of the terminating impedances.

3. The arrangement as claimed in claim 1, wherein the input terminals of the line driver are connected to output terminals of a first current-to-voltage converter connected with its input terminals to the wires of the transmission line, wherein the load has an impedance value that is k times the impedance value between the output terminals of the line driver, k being an integer, and wherein the input terminals of the additional driver are connected to output terminals of a second current-to-voltage converter connected with its input terminals to the output terminals of the additional driver, the second current-to-voltage converter having a current-to-voltage conversion factor that is k times the current-to-voltage conversion factor of the first current-to-voltage converter.

4. The arrangement as claimed in claim 3, wherein the line driver comprises two first current amplifiers connected with their outputs to the wires of the two-wire transmission line, and connected with one of their inputs to the outputs of the first voltage-to-current converter, the inputs of which being connected to the transmission line, the signal source being connected with its outputs to the other input of the first current amplifiers to generate output signals on the transmission line, wherein the additional driver comprises two second current amplifiers having a current amplification factor that is 1/k times the current amplification factor of the first current amplifiers, connected with their outputs to the load, and connected with one of their inputs to the outputs from the second voltage-to-current converter, the inputs of which being connected to said load, the other inputs of said second current amplifiers being connected to outputs of said signal source for generating the signals across the load.

5. The arrangement as claimed in claim 4, wherein each of the first and the second current amplifiers comprises:

an operational amplifier;

a first resistor connected between the output terminal of the operational amplifier and the output terminal of the current amplifier;

a second resistor connected between the output terminal of the current amplifier and the input terminal of the operational amplifier; and a third resistor connected between the output terminal of the operational amplifier and the input terminal of the operational amplifier, wherein the resistance of the first resistor in the second current amplifiers is k times the resistance of the first resistor in the first current amplifiers.

6. The arrangement as claimed in claim 1, characterized in that output transistors of the additional driver are 1/k times the size of output transistors of the line driver.

* * * * *